(12) United States Patent
De Vos et al.

(10) Patent No.: US 12,240,767 B2
(45) Date of Patent: Mar. 4, 2025

(54) ADSORPTIVE REMOVAL OF PERFLUORINATED OR PARTIALLY FLUORINATED SURFACTANTS

(71) Applicants: KATHOLIEKE UNIVERSITEIT LEUVEN, Leuven (BE); VITO NV, Mol (BE)

(72) Inventors: Dirk De Vos, Holsbeek (BE); Matthias Van Den Bergh, Linden (BE)

(73) Assignees: Katholieke Universiteit Leuven, Leuven (BE); VITO NV, Mol (BE)

( * ) Notice: Subject to any disclaimer, the term of this patent is extended or adjusted under 35 U.S.C. 154(b) by 383 days.

(21) Appl. No.: 17/619,897

(22) PCT Filed: Jun. 29, 2020

(86) PCT No.: PCT/EP2020/068275
§ 371 (c)(1),
(2) Date: Dec. 16, 2021

(87) PCT Pub. No.: WO2020/260702
PCT Pub. Date: Dec. 30, 2020

(65) Prior Publication Data
US 2022/0306491 A1 Sep. 29, 2022

(30) Foreign Application Priority Data
Jun. 28, 2019 (EP) .................... 19183163

(51) Int. Cl.
*C02F 1/28* (2023.01)
*B01J 20/18* (2006.01)
(Continued)

(52) U.S. Cl.
CPC .............. *C02F 1/281* (2013.01); *B01J 20/186* (2013.01); *C02F 2101/301* (2013.01); *C02F 2101/36* (2013.01)

(58) Field of Classification Search
CPC .................... C02F 1/281; C02F 2101/301; C02F 2101/36; B01J 20/186
See application file for complete search history.

(56) References Cited

U.S. PATENT DOCUMENTS 6,436,244 B1    8/2002  Führer et al.
6,518,442 B1    2/2003  Felix et al.
(Continued)

FOREIGN PATENT DOCUMENTS

CN    1136468 A    11/1996
EP    1700869 A1    9/2006
(Continued)

OTHER PUBLICATIONS

Chen et al. (Influence of crystal topology and interior surface functionality of metal-organic frameworks on PFOA sorption performance, 2016, Microporous and Mesoporous Materials, vol. 236, pp. 202-210) (Year: 2016).*

(Continued)

*Primary Examiner* — Youngsul Jeong
(74) *Attorney, Agent, or Firm* — Dinsmore & Shohl LLP

(57) ABSTRACT

The invention relates to methods for recovering a fluorinated surfactant molecule from an aqueous or mixed aqueous organic solution, comprising the step of contacting said solution containing a fluorinated surfactant with a zeolite that has pores delineated by rings that comprise between 10 to 14 tetrahedrally coordinated framework atoms ('T').

9 Claims, 4 Drawing Sheets

(51) Int. Cl.
    C02F 101/30    (2006.01)
    C02F 101/36    (2006.01)

(56)                    References Cited

U.S. PATENT DOCUMENTS 6,613,941 B1     9/2003  Felix et al.
    6,642,415 B1    11/2003  Führer et al.
    6,825,250 B2    11/2004  Epsch et al.
    2002/0151748 A1  10/2002  Jones
    2007/0138110 A1   6/2007  Welcker
    2010/0072134 A1   3/2010  Mader

FOREIGN PATENT DOCUMENTS

IN         104529031 A    4/2015
    WO       2015160926 A1   10/2015

OTHER PUBLICATIONS

Joos et al. (Molecular Simulation Study of the Competitive Adsorption of H2O and CO2 in Zeolite 13X, Langmuir, 2013, vol. 29, pp. 15936-15942) (Year: 2013).*

International Search Report mailed Jun. 10, 2020, in reference to co-pending European Patent Application No. PCT/EP2020/068275 filed Jun. 29, 2020.

Ateia, et al., "Rapid Removal of Poly- and Perfluorinated Alkyl Substances by Poly(ethlenimine)-Functionalized Cellulose Microcrystals at Environmentally Relevant Conditions", Environmental Science & Technology Letters, vol. 5, pp. 764-769, 2018.

Chularueangaksorn, et al., "Adsorption of perfluorooctanoic acid (PFOA) onto anion exchange resin, non-ion exchange resin, and granular-activated carbon by batch and column", Desalination and Water Treatment, vol. 52, pp. 6542-6548, Oct. 2014.

Chularueangaksorn, et al., "Batch and Column Adsorption of Perfluorooctane Sulfonate on Anion Exchange Resins and Granular Activated Carbon", Journal of Applied Polymer Science, pp. 1-7, 2014.

Clark, et al., "Highly Defective UiO-66 Materials for the Adsorptive Removal of Perfluorooctanesulfonate", ACS Sustainable Chemistry & Engineering, vol. 7, pp. 6619-6628, 2019.

Clarke, et al., "Review of 'emerging' organic contaminants in biosolids and assessment of international research priorities for the agricultural use of biosolids", Environmental International, vol. 37, pp. 226-247, 2011.

Deng, et al., "Removal of perfluorooctane sulfonate from wastewater by anion exchange resins: Effects of resin properties and solution chemistry", Science Direct, vol. 44, pp. 5188-5195, 2010.

Dijkmans, et al., "Cooperative Catalysis of Multistep Biomass Conversion with Sn/Al Beta Zeolite", ACS Catalysis, vol. 5, pp. 928-940, 2015.

Du, et al., "Adsorption behavior and mechanism of perfluorinated compounds on various adsorbents—A review", Journal of Hazardous Materials, vol. 274, pp. 443-454, 2014.

Gomis, et al., "Comparing the toxic potency in vivo of long-chain perfluoroalkyl acids and fluorinated alternatives", Environment International, vol. 113, pp. 1-9, 2018.

Ji, et al., "Removal of GenX and Perfluorinated Alkyl Substances from Water by Amine-Functionalized Covalent Organic Frameworks", Journal of the American Chemical Society, vol. 140, pp. 12677-12681, 2018.

Kucharzyk, et al., "Novel treatment technologies for PFAS compounds: A critical review", Journal of Environmental Management, vol. 204, pp. 757-764, 2017.

Lampert, et al., "Removal of Perfluorooctanoic Acid and Perflourooctane Sulfonate from Wastewater by Ion Exchange", Pract. Period Hazard, Toxic, & Radioactive Waste Management, vol. 11, No. 1, pp. 60-68, 2007.

Wang., et al., "Effect of humic acid on the sorption of perfluorooctane sulfonate (PFOS) and perfluorobutane (PFBS) on beohmite", Chemosphere, vol. 118, pp. 213-218, 2015.

Li, et al., "Removal of perfluorooctanoic acid from water with economical mesoporous melamine-formaldehyde resin microsphere", Chemical Engineering Journal, vol. 320, pp. 501-509, 2017.

Lindstrom, et al., "Polyfluorinated Compounds:Past, Present, and Future", Environmental Science & Technology, vol. 45, pp. 7954-7961, 2011.

Liu, et al., "Understanding the Adsorption of PFOA on MIL-101(Cr)-Based Anionic-Exchange Metal-Organic Frameworks: Comparing DFT Calculations with Aqueous Sorption Experiments", Environmental Science & Technology, vol. 49, pp. 8657-8665, 2015.

Maimaiti, et al., "Competetive adsorption of perfluoroalkyl substances on anion exchange resins in simulated AFFF-impacted groundwater", Chemical Engineering Journal, vol. 348, pp. 494-502, 2018.

Merino, et al., "Degradation and Removal Methods for Perfluoroalkyl and Polyfluoroalkyl Substances in Water", Environmental Engineering Science, vol. 33, No. 9, pp. 615-649, 2016.

Nassi, et al., "Removal of perfluorooctanoic acid from water by adsorption on high surface area mesoporous materials", Journal of Porous Mater, vol. 21, pp. 423-432, 2014.

Ochoa-Herrera, et al., "Removal of perfluorinated surfactants by sorption onto granular activated carbon, zeolite and sludge", Chemosphere, vol. 72, pp. 1588-1593, 2008.

Schuricht, et al., "Removal of perfluorinated surfactants from wastewater by adsorption and ion exchange—Influence of material properties, sorption mechanism and modeling", ScienceDirect, vol. 54, pp. 160-170, 2017.

Senevirathna, et al., "A comparative study of adsorption of perfluorooctane sulfonate (PFOS) onto granular activated carbon, ion-exchange polymers and non-ion-exchange-polymers", Chemosphere, vol. 80, pp. 647-651, 2010.

Sini, et al., "Metal-organic framework sorbents for the removal of perfluorinated compounds in an aqueous environment", New Journal of Chemistry, vol. 42, No. 22, pp. 17781-18472, Nov. 21, 2018.

Woodard, et al., "Ion exchange resin for PFAS removal and pilot test comparison to GAC", Research Article Remediation, vol. 27, pp. 19-27, 2017.

Xiao, et al., "B-Cyclodextrin Polymer Network Sequesters Perfluorooctanoic Acid at environmentally Relevant Concentrations", Journal of the American Chemical Society, vol. 139, pp. 7689-7692, 2017.

Yu, et al., "Effect of effluent organic matter on the adsorption of perfluorinated compounds onto activated carbon", Journal of Hazardous Materials, vol. 225-226, pp. 99-106, 2012.

Yu, et al., "Sorption of perfluorooctane sulfonate and perfluorooctanoate on activated carbons and resin: Kinetic and isotherm study", ScienceDirect, vol. 43, pp. 1150-1158, 2009.

Yu, et al., "Selective removal of perfluorooctane sulfonate from aqueous solution using chitosan-based molecularly imprinted polymer adsorbents", ScienceDirect, vol. 42, pp. 3089-3097, 2008.

Zaggia, et al., "Use of strong anion exchange resins for the removal of perfluoroalkylated substances from contaminated drinking water in batch and continuous pilot plants", Water Research, vol. 91, pp. 137-146, 2016.

Zhao, et al., "Nonionic Triblock and Star Diblock Colpolymer and Oligomeric Surfactant Syntheses of Highly Ordered, Hydrothermally Stable, Mesoporous Silica Structures", Journal of American Chemical Society, vol. 120, pp. 6024-6036, 1998.

* cited by examiner

ADSORPTIVE REMOVAL OF PERFLUORINATED OR PARTIALLY FLUORINATED SURFACTANTS

CROSS REFERENCES TO RELATED APPLICATIONS

This application is a national-stage application under 35 U.S.C. § 371 of International Application No. PCT/EP2020/068275, filed Jun. 29, 2020, which International Application claims benefit of priority to European Patent Application No. 19183163.5, filed Jun. 28, 2019.

FIELD OF THE INVENTION

The present invention relates to a method for adsorptive removal of perfluorinated or partially fluorinated surfactants from industrial waste water or natural surface water, in particular from water containing also non-fluorinated, organic compounds.

BACKGROUND OF THE INVENTION

Perfluorinated compounds (PFCs) are a class of persistent organic pollutants which, in recent years, have been gaining a lot of attention. Extensively used over the past 40 years, they are only now fully recognized as top priority pollutants, due to their widespread occurrence in (drinking) water, food products, animals and even humans (Clarke & Smith (2011) Environ. Int. 37, 226-247; Murray et al. (2010) Environ. Poll. 158, 3462-3471). Exposure to PFCs is associated with a series of health risks, including liver and kidney cancer and affects fetus and child growth (Gomis et al. (2018) Environ. Int. 113, 1-9; Lindstrom et al. (2011) Environ. Sci. Techn. 45, 7954-7961). Increased awareness of the risks of PFCs has led to governmental regulation worldwide, ranging from restrictions on production and consumption to the implementation of threshold concentrations for PFCs in tap, surface and waste water. Most of this new regulation focuses on perfluorooctanoic acid (PFOA) and perfluorooctanesulfonic acid (PFOS), the two most used and spilled PFCs.

PFCs tend to be extremely persistent, due to the carbon-fluorine bond, which is one of the strongest bonds in chemistry. Over the years, this has led to an accumulation of several PFCs in waste and surface waters. Conventional waste water treatment plants (WWTPs) are unable to remove PFCs from water. As such, the implementation of environmental standards worldwide requires new and suitable techniques to remove PFCs in low concentrations from complex water matrices. Several techniques, like sonolysis and electrochemical or photochemical catalysis are being explored for the degradation of PFCs in water, but they suffer from high energy demands and require several pretreatment steps (Kucharzyk et al. (2017) J. Environ. Manag. 204(2), 757-76; Merino et al. (2016) Environ. Engin. Sci. 33, 615-649; US20070138110, US20100072134, CN104529031B). This makes them unsuitable for the treatment of large water volumes. In this regard, adsorption is arguably the best technique to treat large volumes while keeping energy costs modest.

Up until now, a considerable amount of research has been carried out on the isolation of PFCs from water via adsorption (Du et al. (2014) J. Hazard. Mat. 274, 443-454).

Most adsorption studies use model PFC solutions, without the non-fluorinated organic compounds that are present in real situations. A single study that does explore the impact of organic matter on PFC adsorption reports a drastic decline of capacity for PFCs on conventional adsorbents like activated carbon (Yu et al. (2012) J. Hazard. Mat. 99, 225-226). So far, no adsorbents are known that selectively accumulate fluorinated compounds in the presence of competing organics. Nassi et al. (2014) J. Porous Mat. 21, 423-432, used siliceous porous materials for the adsorption of PFOA from aqueous solutions. These materials, well known in the literature as MCM-41 or HMS have ordered mesopores but they lack the short range crystalline order that is defining for zeolite materials. Relatively modest uptake capacities were observed for PFOA, with maximally 8 mg PFOA per g of HMS. However, no data are available regarding the uptake in the presence of competing, non-fluorinated organic compounds. Ochoa-Herrera & Sierra-Alvarez (2008) Chemosphere 72(10), 1588-1593, studied the adsorption of perfluorinated surfactants on various zeolites, in a comparative study in which granular activated carbon showed generally better performance, e.g. higher uptake capacity and higher affinity, than the zeolites studied. The best performing zeolite was a faujasite type zeolite (FAU topology) with a Si/Al ratio of 80. This material has a maximal capacity for PFOS uptake of only 105 mg/g zeolite, even at high residual concentration in the liquid, e.g. 30 mg PFOS per l. However, no data are available regarding the uptake in the presence of competing, non-fluorinated organic compounds. Leckie et al. (2015) Chemosphere 118, 213-218, studied the adsorption of PFOS and related perfluorinated sulfonates on a high surface area boehmite (300 m$^2$ g$^{-1}$). The highest reported uptake capacities were modest, viz. 0.15 mg PFOS per g of boehmite. Remarkably, this capacity sharply decreased, e.g. to 0.04 mg PFOS per g of zeolite, in the presence of even low concentrations of humic acid, e.g. 10 mg per l.

Several authors (Lampert et al. (2007) Practice Periodical of Hazardous Toxic and Radioactive Waste Management 11(1), 60-68; Senevirathna et al. (2010) Chemosphere 80, 647-651; Schuricht et al. (2017) J. Environ. Sci. 54, 160-170; Deng et al. (2010) Water Res. 44, 5188-5195; Li et al. (2017) Chem. Engin. J. 320, 501-509; Yu et al. (2009) Water Res. 43(4), 1150-1158; Chularueangaksorn et al. (2014) J. Appl. Pol. Sci. 131, 39782; Maimaiti et al. (2018) Chem. Engin. J. 348, 494-502; Woodard et al. (2017) Remediation 27, 19-27; Zaggia et al. (2016) Water Res. 91, 137-146) studied the uptake of PFOA, PFOS and other PFCs on anion-exchangers. The investigated resins vary in matrix (polyacrylic, polystyrene, polystyrene-divinylbenzene, etc.), functional group (tertiary amine or quaternary ammonium) and porosity (gel-type, macroporous or mesoporous). The highest uptake capacity for PFOS is reported by Deng et al. for the polyacrylic resin IRA67 at 2500 mg/g resin. Yu et al. note the highest exchange capacity for PFOA with 1400 mg/g resin at the polystyrene-DVB resin IRA400. Anion-exchange resins are widely applied in industry for the recovery of PFCs, especially in product streams and waste streams with very high PFC concentrations. Some of these resins are patented by the industrial manufacturers of PFCs (U.S. Pat. Nos. 6,613,941B1, 6,518,442B1, 6,825,250B2).

These anion exchangers often suffer from a strong decline in exchange capacity in the presence of competing inorganic anions and organic matter. They are especially susceptible to the competition of divalent inorganic anions like sulfate (Du et al. (2014) J. Hazard. Mat. 274, 443-454) and organic anionic compounds like sodium dodecylsulfate (SDS) and humic acid (Maimaiti et al. cited above). Zaggia et al. (cited above) studied three different resins for the uptake of PFOA in PFOS and reported a reduction of >99.9% in uptake of PFOA and PFOS for the best performing resin (Purolite® A532E) when switching from single-solute batch experiments to continuous-flow experiments with real case groundwater. Du et al. (2014) cited above, state that the regeneration of the spent anion-exchangers is often cumbersome and requires elution with a mixed methanol and salt solution, involving the use of volatile and toxic solvents and the generation of stoichiometric amounts of waste products. The resulting waste eluate cannot always be recycled and needs to be incinerated. In the fluorochemical industry, where PFC concentrations in waste streams are high, it can be more benign to recycle rather than incinerate the PFCs. Several patents from industrial PFC manufacturers cover the elution and subsequent recycling of PFCs from spent ion-exchange resins (EP1700869, WO2015160926, US20020151748, U.S. Pat. Nos. 6,436,244, 6,642,415).

It is known from Senevirathna et al. (2010) cited above, and Chularueangaksor et al. (2014) *Desalination and Water Treatment* 52, 6542-6548, that also non-ionic resins can adsorb PFOS, however in much lower quantities than their anionic counterparts. The highest reported uptake for PFOA and PFOS on non-ionic resins is ca. 40 mg/g resin. Similar to anion-exchange resins, metal-organic frameworks (MOFs) can be used for the ion-exchange of PFCs. This is especially the case for zirconium-based MOFs (e.g. UiO-66) or chromium-based MOFs (e.g. MIL-101 (Cr)), where the positively charged metal nodes act as exchange sites. Clark et al. (2019) *ACS Sustainable Chem. Eng.* 7, 6619-6628) studied a highly defective UiO-66 MOF with a maximal uptake capacity for PFOS of 620 mg/g. The uptake capacity of these MOFs for PFCs can be further tuned by modification of the organic linkers, e.g. amine-grafted terephthalate linkers for MIL-101 (max. uptake capacity: 782 mg PFOA/ g; Liu et al. (2015) *Environ. Sci. Techn.* 49, 8657-8066)) or fluorinated terephthalate linkers for UiO-66 (max. uptake capacity: 470 mg PFOA/g; Sini et al. (2018) *New J. Chem.* 22, 17889-17894). Related to MOFs, Ji et al. (2018) *J. Am. Chem. Soc.* 140 12677-12681, studied the use of covalent organic frameworks (COFs) for the uptake of PFCs. COFs are porous, crystalline polymers. They report a maximal uptake capacity of 200 mg/g for the perfluoro-compound GenX with an imine-linked, primary amine-bearing polymer. Also cyclodextrin-based polymers are found to adsorb PFCs in significant amounts. Xiao et al. (2017) *J. Am. Chem. Soc.* 139, 7689-7692) report β-cyclodextrin, a macrocycle composed of seven glucose units with an uptake capacity for PFOA of 34 mg/g and an apparent 10-fold higher affinity for PFOA than activated carbon. Such type of polymer is specifically constructed to target a certain adsorbate compound and is therefore called a molecular imprinted polymer (MIP). Another example of a MIP for PFC adsorption is a chitosan-based polymer, studied by Yu et al. (2008) *Water Res.* 42(12), 3089-3097. They report a maximum uptake capacity for PFOS of 280 mg/g. Also cellulose-based polymers are investigated for PFC adsorption, however, adsorption capacity of these cellulose-type polymers is rather low compared to other adsorbents. Ateai et al. (2018) *Environ. Sci. Techn. Lett.* 5, 764-769, report a maximum uptake capacity of 2.3 mg PFOA/g for poly(ethylenimine)-functionalized cellulose microcrystals. As for anion-exchangers, a strong decline of PFC adsorption in the presence of divalent anions like sulfate is mentioned.

SUMMARY OF THE INVENTION

A method is described for removing fully or partially fluorinated compounds from aqueous solutions by adsorption on a zeolite adsorbent with appropriate pore architecture and with an essentially neutral framework.

A first objective, is to reach high uptake capacities for the fluorinated compounds, even at low concentrations. These uptakes are higher than what can be achieved with other porous adsorbents for similar adsorption processes, as described in the state-of-the-art.

A second objective of the present invention, is to selectively remove these fluorinated compounds by adsorption, even when non-fluorinated organic compounds are present in the same aqueous solution. This selectivity is reflected in the fact that the uptake of the fluorinated compound is not affected, even when significant concentrations of non-fluorinated organics are present.

Both objectives, viz. a high uptake capacity, and a high selectivity, can be achieved by using a suitable zeolite topology, in combination with a suitable composition of the zeolite material. With the appropriate zeolite material, the adsorption can be carried out according to this invention.

The invention is further summarized in the following statements.

1. A method for recovering a fluorinated surfactant molecule from an aqueous or mixed aqueous organic solution, comprising the step of contacting said solution containing an fluorinated surfactant with a zeolite that has pores delineated by rings that comprise between 10 to 14 tetrahedrally coordinated framework atoms ('T').
2. The method according to statement 1, wherein the zeolite framework is non-charged and non-polar.
3. The method according to statement 1 or 2, wherein said zeolite contains only $Si^{4+}$, $Ge^{4+}$, $Ti^{4+}$, $Sn^{4+}$, $Zr^{4+}$ or $Hf^{4+}$ as tetrahedrally coordinated framework atoms.
4. The method according to any one of statements 1 to 3, wherein said zeolite only contains $Si^{4+}$ as tetrahedrally coordinated framework atom.
5. The method according to any one of statements 1 to 4, wherein the zeolite has at least one type of pore delineated by 12-membered rings.
6. The method according to any of statements 1 to 5, wherein the zeolite has a framework topology selected from the group consisting of, AFI, *BEA, BEC, CON, EMT, FAU, IFR, ISV, IWW, MEI, MOR, MOZ, MSE, MTW, *STO, UOV, UTL and YFI.
7. The method according to any one of statements 1 to 6, wherein the fluorinated surfactant is selected from the group consisting of a linear perfluorinated alkylcarboxylic acid, a or branched perfluorinated alkylcarboxylic acid, or and a partially fluorinated alkylcarboxylic acid, in which wherein the (partially) one or more fluorinated alkyl groups are optionally may be substituted with an ether groups, either fluorinated or not.
8. The method according to any one of statements 1 to 6, wherein the fluorinated surfactant is a linear perfluorinated alkylsulfonic, aor branched perfluorinated alkylsulfonic acid or an alkylsulfonate, or a partially fluorinated alkylsulfonic acid or alkylsulfonate, wherein one or more (partially) fluorinated alkyl groups are substituted with an ether group, either fluorinated or not.
9. The method according to any one of statements 1 to 6, wherein the fluorinated surfactant is a linear branched perfluorinated alcohol or a branched perfluorinated alcohol, or a partially fluorinated alcohol, wherein one or more (partially) fluorinated alkyl group is optionally substituted with an ether group, either fluorinated or not.
10. The method according to any of statements 1 to 6, wherein the fluorinated surfactant is a fully or partially fluorinated alkylsulfate, fully or partially fluorinated alkylcarboxylate ester, fully or partially fluorinated alkylamine, or fully or partially fluorinated alkylammonium compound.

DETAILED DESCRIPTION OF THE INVENTION

Figure Legends

Figure 11:
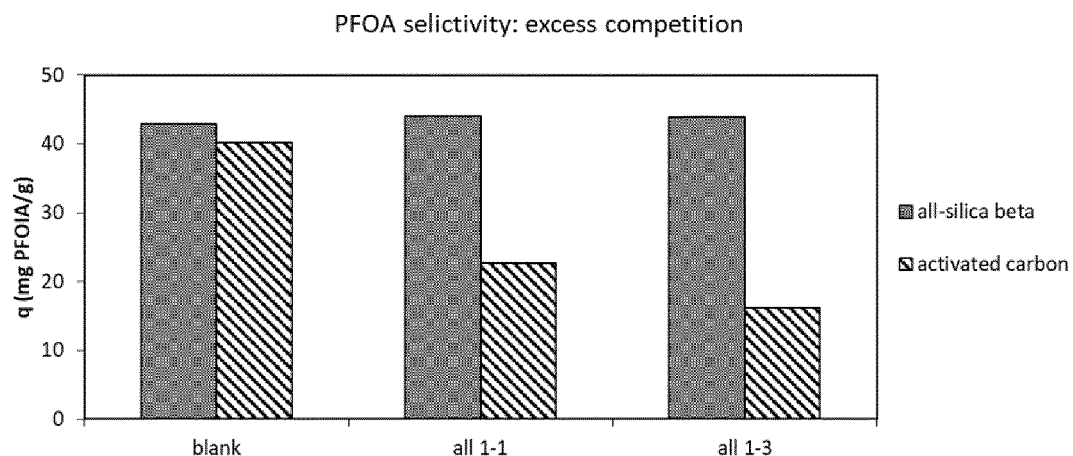
Figure 12:
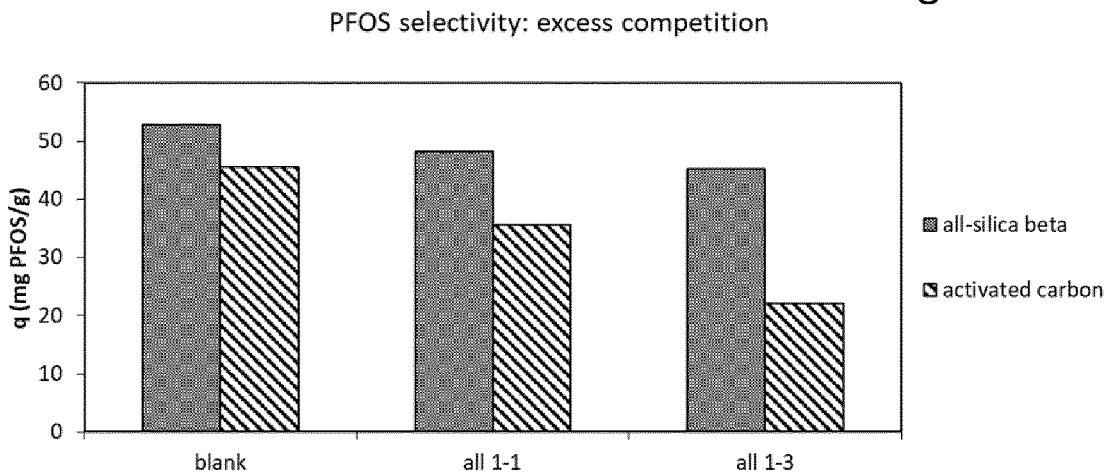

FIG. 11 shows adsorption of PFOA on all-silica zeolite beta and activated carbon for the two different situations of organic competition FIG. 12 shows adsorption of PFOS on all-silica zeolite beta and activated carbon for the two different situations of organic competition The invention provides a method for the uptake of fully or partially fluorinated surfactants by an adsorbent, even in the presence of competing anionic or organic compounds. Typical target compounds are perfluorinated surfactants, such as perfluorooctanoic acid (PFOA) or perfluorooctylsulfonic acid (PFOS), as well as variants of these molecules, with either shorter carbon chains (e.g. C6, C4) or longer ones up to C2 or C14. The scope of the method also comprises molecules that are structurally and functionally closely related fluorinated compounds perfluoro 2-propoxypropionic acid and its salts, known under its commercial name Gen-X™.

It is particularly challenging to selectively isolate these molecules from a complex aqueous background that contains competing anions or competing organic molecules. Depending on the mechanism that is exploited to achieve the uptake of such molecules, either ion exchangers can be used, or other adsorbents in which a mere physisorption takes place.

Regarding the ion exchange process, competing anions will unavoidably disturb the ion exchange. Such anions may e.g. be present in surface and ground water at concentrations of 1-150 ppm. Examples of such inorganic anions are chloride, sulfate, nitrate or phosphate; organic anions could be formed from carboxylic acids, sulfonic acids or monoalkyl sulfate esters. Ion exchangers could be the resins classically used for such purpose, such as those with permanent charges on a polystyrene matrix functionalized with quaternary ammonium groups; but also new material types like covalent-organic frameworks, that bear aminogroups, in fact function as ion exchangers, in this case of the weakly basic type. An additional disadvantage of these resins is that they can only be regenerated by applying an acid base process, generating significant amounts of salts. They can not be regenerated by any thermal treatment (at temperatures significantly above 100° C.) since they are liable to thermal decomposition.

On the other hand, adsorbents in which the uptake of the fluorinated compounds takes place via physisorption, such as active carbon, are expected and observed to work less well when the medium contains other organics, such as non-fluorinated carboxylic acids or alkylsulfonates. Since the fluorous tail of perfluorinated compounds has been described both as hydrophobic and as oleophobic, it is so far very unclear which surfaces could confer to a porous adsorbent affinity for fluorous surfactant tails.

Surprisingly, the inventors found that specific zeolites allow the uptake of compounds like PFOA and PFOS with very high capacity and with very high selectivity, implying that the uptake characteristics are not measurably affected by the presence of other organics. Thus, uptake of PFOA is not decreased by the simultaneous presence of carboxylic acids.

To be useful for the process of the invention, these specific zeolites must first have appropriate pore volumes, and especially pore diameters in the range of 0.6-1 nm, or more preferably 0.6-0.8 nm. In terms of zeolite architecture, this means that materials with 12-membered or larger rings are useful materials, with the 12-membered rings being preferred; thus the pore perimeter consists of 12 tetrahedrally coordinated framework atoms (called T-atoms), all of them linked by oxide anions to the adjacent T-atom. Secondly, it is highly advantageous that the zeolite framework is essentially non-charged and non-polar, meaning that the framework cations preferably only have a charge of +4. Hence, isomorphous substitution of the tetravalent cations (like $Si^{4+}$) by lower valent cations (like $Al^{3+}$, $B^{3+}$, $Ga^{3+}$, $Fe^{3+}$ etc) is undesired, since this creates charge in the framework that needs to be compensated by a countercation, making the material too polar to adsorb the fluorinated surfactants. Thirdly, it is important that the zeolite material contains as few defects as possible. Indeed, it is known that zeolite frameworks are terminated by silanol groups at the outer surface; but also inside the pores, structural defects, e.g. corresponding to missing framework T-atoms, can result in the presence of such silanol groups. Whatever their precise location, silanol groups always increase the hydrophilicity of materials, due to the ability of the Si—OH groups to form hydrogen bonds with water. Naturally, the presence of —OH groups also decreases the material's affinity for perfluorinated fragments. The number of silanol groups can be quantified according to methods known to persons skilled in the art, e.g. Fourier Transform Infrared Spectroscopy, or solid state NMR methods.

Zeolites with 12-membered rings (12-MR) are well known in the art. The pore network in the zeolite crystals can be one-, two- or three-dimensional in nature; intersections between these pores can provide slightly more space than the pores themselves, as is the case in Beta-type zeolites with *BEA or BEC topology. In some 12-MR zeolites, large cages are formed, like in materials with FAU or EMT topology. Examples of potentially useful zeolite topologies can be found in the database of the International Zeolite Association ['Atlas of Zeolite Framework Types', 6th Ed. Baerlocher et al., Elsevier Science, 2007], with as examples AFI, ATS, BOG, EON, ITG, IWS, IWV, LTF, MAZ, OFF, *PCS, *SFV and SSF topologies, or even more preferably *BEA, BEC, CON, EMT, FAU, IFR, ISV, IWW, MEI, MOR, MOZ, MSE, MTW, *STO, UOV, UTL and YFI topologies. For the purpose of the invention, FAU, EMT, *BEA and BEC are particularly preferred, with *BEA and BEC being most particularly preferred.

Irrespective of the zeolite topology, the zeolites can be prepared via various routes that give rise to diverse compositions. The present invention requires materials with only tetravalent cations in the framework; however, many zeolites are prepared with part of the tetravalent cations (like $Si^{4+}$) isomorphously substituted with trivalent ones (like $Al^{3+}$). In order to partially or fully remove the trivalent cations from the framework, many procedures are known in the art, e.g. based on acid leaching, steam treatment of the lattice etc. However, silanol-type defects are often created at the lattice position where the lower valent cation is removed, and this is unfavorable for the purpose of the invention. These silanol groups can be detected by several physico-chemical techniques, such as FTIR vibrational spectroscopy, where they give rise to light absorptions between the wavenumbers 3500 and 3750 $cm^{-1}$, or by solid state NMR. To some extent, these defects may be repaired by re-insertion of Si into the framework, but this latter reaction is difficult to conduct to full completion. Summarizing, while zeolites with very high contents of tetravalent cations like $Si^{4+}$ can be prepared by the process of post-synthetic zeolite modification, it is not obvious to obtain materials that have low contents of silanol groups.

Therefore, for the invention it is more appropriate to directly prepare all-silica zeolites in the primary, hydrothermal formation of the framework, avoiding the presence of any other inorganic element in the framework than silicon and oxygen. It is also known in the art that instead of silicon, other tetravalent cations could be incorporated in the zeolite structure. These do not induce the formation of a permanent charge, and hence, the resulting materials are in principle suitable for the process of this invention. Examples of such alternative tetravalent cations are $Ge^{4+}$, $Sn^{4+}$, $Ti^{4+}$, $Zr^{4+}$ or $Hf^{4+}$. However, the materials containing Ge are generally less stable to water, and this could eventually lead to increase of the number of silanol groups in the material. Also the incorporation of Sn, Ti, Zr or Hf is known to seldomly lead to a perfect tetrahedral coordination to 4 adjacent framework oxygen atoms, implying that overall, the all-silica composition of the framework is the most preferred one.

In some cases, formation of an all-silica zeolitic framework is possible by subjecting a synthesis gel consisting of water, a Si source and an inorganic or organic base to a hydrothermal treatment. Addition of an organic structure directing agent, e.g. a quaternary ammonium compound, or an amine, may be advantageous. Additionally, it can be advantageous to add fluoride to the zeolite synthesis mixture. Fluoride is known as a mineralizing agent, able to dissolve not only the Si source, but also any imperfectly crystallized particles. Hence, it is known in the zeolite synthesis art, that materials prepared via fluoride synthesis routes, present significantly fewer defects than those prepared via classical routes. Before being used in an adsorption application, it is appropriate to pre-treat the freshly synthesized zeolite by washing, and possibly drying or even applying a high temperature pre-treatment. The latter is especially useful if the preparation of the zeolite material involved an organic structure directing agent, which must be removed from the pores to allow full utilization of the pore volume.

The process can be conducted in batch, with addition of the adsorbent to an aqueous solution of the fluorous surfactant. Alternatively the adsorbent can be shaped into any form known in the art, such as beads, pellets, extrudates etc, loaded into a column and then used in a continuous operation mode, in which liquid is steadily pumped through the column.

The process can be applied using a fully aqueous solvent, but alternatively, the solvent can also be a mixture of water and an organic solvent, which preferentially form a single phase.

The process can be conducted at any temperature between 5° and 300° C., preferably between 20° C. and 60° C., most preferably in ambient or near-ambient conditions.

This invention will now be demonstrated in more detail by examples, which it is in no means limited to.

Example 1

A zeolite adsorbent with *BEA topology and a $SiO_2$/$Al_2O_3$ ratio of 25 was dealuminated according to the literature method of Dijkmans et al. (2015) *ACS Catalysis* 5, 928-940). An amount of 3 g of the zeolite was dispersed in 165 mL of a 7 M aqueous $HNO_3$ solution and the solution was left stirring overnight. The zeolite was separated, rinsed thoroughly with deionized water and dried overnight at 333K.

Example 2

A zeolite adsorbent with *BEA topology and an all-Si composition was prepared according to the literature method of Serrano et al. (2001) *Micropor. Mesopor. Mat.* 46(1), 35-46. Amounts of 9.48 mL of tetraethylammonium hydroxide, 1.19 mL of water and 9.56 mL of tetraethyl orthosilicate were mixed and stirred for 6.5 hours at room temperature. After addition of 1.02 mL HF (40 wt %) and 0.128 g of the zeolite of Example 1, crystallization of the zeolite was carried out in a Teflon liner under static conditions at 408 K for 168 hours. The solid product was separated from the liquid phase by filtration and washed repeatedly with deionized water. The zeolite product was obtained after thermal treatment at 823 K for 6 hours.

Example 3

A zeolite adsorbent with MFI topology, 10-membered ring openings and an all-Si composition was prepared according to the literature method of Wang et al. (2017) *Micropor. Mesopor. Mat* 242, 231-237). An amount of 4.62 mL of Ludox HS-40, 0.32 mL of ethylamine (70 wt %), 1.29 g of tetrapropylammonium bromide, 0.24 g sodium hydroxide, 32.40 mL water and 0.24 g of crystal seeds (prepared according to the literature method of Persson et al. (1994) *Zeolites* 14, 557-567) was mixed and stirred for 3 hours. The synthesis mixture was crystallized for 20 hours at 453 K under static conditions. The solid product was separated from the liquid phase by filtration and washed repeatedly with deionized water. The zeolite product was obtained after thermal treatment at 823 K for 5 hours.

Example 4

Two highly ordered hexagonal mesoporous silica (SBA-15 and MCM-41) were synthesized according to the respective literature methods. The synthesis of SBA-15 is described by Zhao et al. (1998) *J. Am. Chem. Soc.* 120, 6024-6036. 4 g of Pluronic P123 (a commercial, nonionic alkyl poly(ethylene oxide) oligomeric surfactant) was dissolved in 30 g of water and 120 g of 2M HCl solution with stirring at 308 K. Then 8.5 g of tetraethyl orthosilicate was added and the resulting solution was stirred at 308 K for 20 h. The solid product was filtered off, washed with water and air-dried at 298 K. The product was thermally treated at 773 K for 6 h. The synthesis of MCM-41 is described by Grün et al. (1997) *Adv. Mater.* 9, 254-257). The mesoporous silica phase was prepared by dissolving 2.50 g of cetyltrimethylammonium bromide in 50 mL of water. Afterwards, 60 g of ethanol and 13.2 g of ammonium hydroxide were added and stirred for 15 min to obtain a homogeneous solution. Then 4.67 g of tetraethyl orthosilicate was rapidly added and the resulting solution was stirred for 2 h. The precipitate was filtered off and washed with 100 mL of deionized water and 100 mL of methanol. The solid product was dried overnight at 343 K and afterwards thermally treated at 823 K for 8 h.

Example 5

Figure 1:
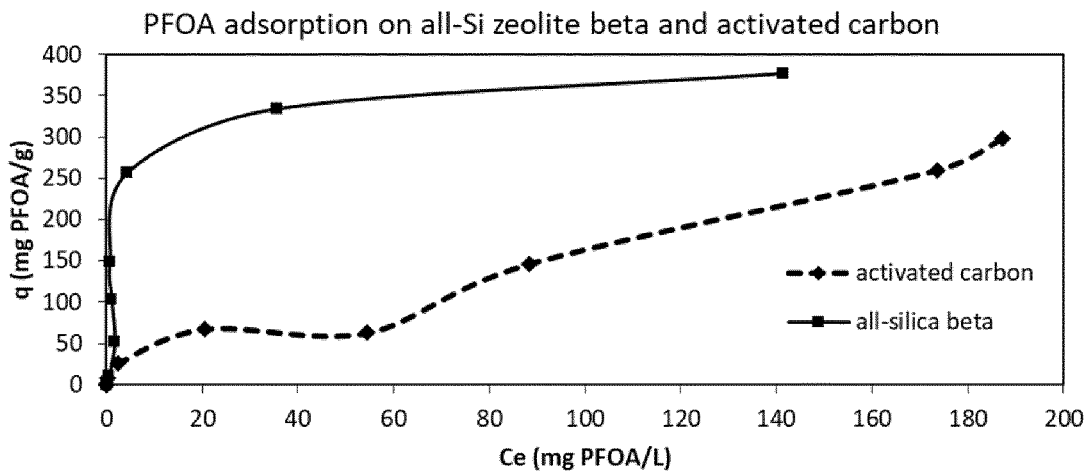
FIG. 1 is a graphical illustration of PFOA uptake on all-silica zeolite beta adsorbent and activated carbon adsorbent for different equilibrium concentrations of PFOA.
Figure 2:
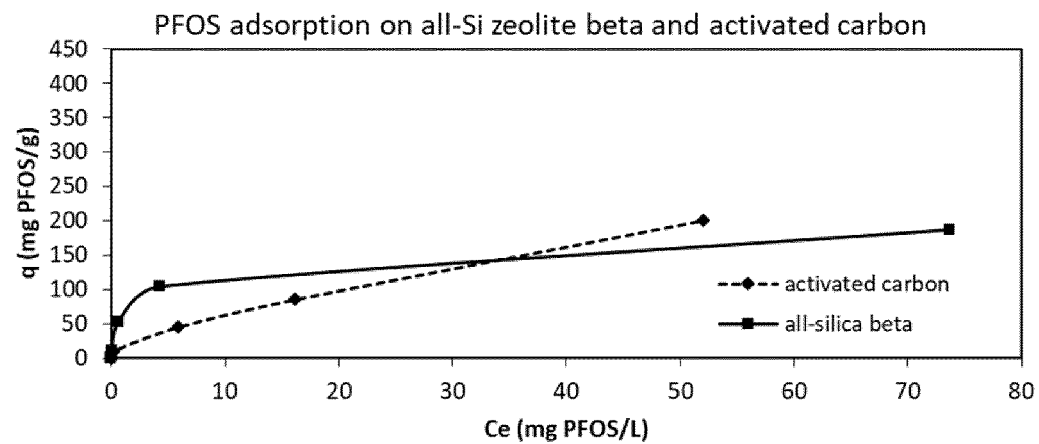
FIG. 2 is a graphical illustration of PFOS uptake on all-silica zeolite beta and on activated carbon.

This experiment describes the use of an all-silica adsorbent with *BEA topology (as synthesized, see Example 1-2, hereafter called all-silica zeolite beta) and a commercial granular activated carbon (Norit SX 1 G) for the removal of PFOA and PFOS from aqueous samples. An amount of 5 mg of adsorbent was contacted with 5 mL of an aqueous sample with a known PFOA or PFOS concentration. PFOA stock concentrations ranged from 0.1 mg/L to 500 mg/L, while PFOS stock concentrations ranged from 0.1 mg/L to 250 mg/L (see Table 1). A lower maximum concentration is used for PFOS in order to avoid micelle formation, since PFOS has a lower critical micelle concentration (CMC) than PFOA. The samples were shaken for 24 hours and PFC uptake on the zeolite adsorbents was measured. FIG. 1 is a graphical illustration of the PFOA uptake on the all-silica zeolite beta adsorbent and the activated carbon adsorbent for different equilibrium concentrations of PFOA. FIG. 2 is a graphical illustration of the PFOS uptake on the all-silica zeolite beta and on activated carbon. The uptake of PFOA was higher for all-Si zeolite beta than for activated carbon, especially so at lower concentrations. This shows that all-Si zeolite beta has a high affinity for the adsorption of PFOA. The adsorption isotherm for PFOS was rather similar for all-Si zeolite beta and activated carbon, but again all-Si beta showed higher affinity at lower PFC concentrations.

TABLE 1

| PFC | Stock concentrations (mg PFC/L) | | | | | | | | |
|---|---|---|---|---|---|---|---|---|---|
| PFOA | 0.1 | 1 | 10 | 50 | 100 | 150 | 250 | 350 | 500 |
| PFOS | 0.1 | 0.5 | 1 | 10 | 50 | 100 | 250 | | |

Example 6

Figure 3:
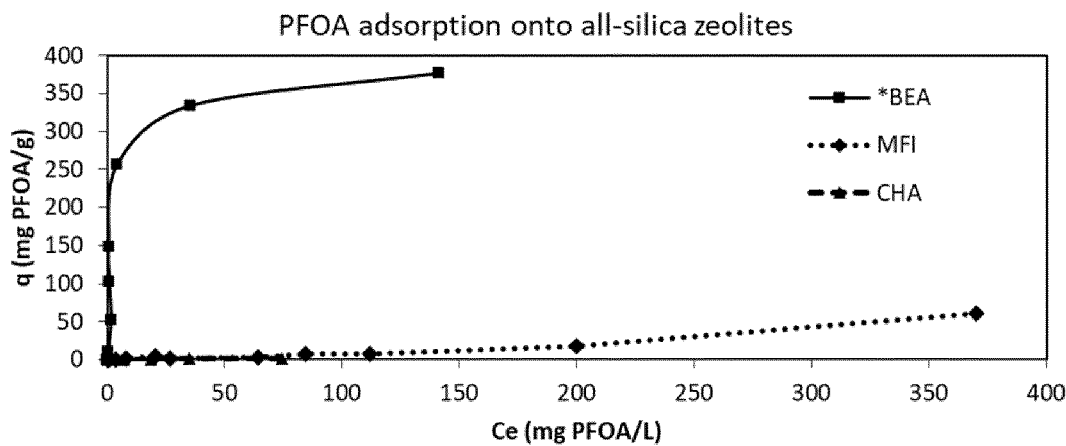
FIG. 3 shows PFOA uptake on zeolite adsorbents for different PFOA equilibrium concentrations.

This experiment describes the use of an all-Si zeolite with MFI topology and 10-membered ring openings (silicalite-1) and a very high-Si zeolite with CHA topology and 8-membered ring openings (chabazite) for the removal of PFOA from aqueous samples. Similar to all-Si zeolite beta, both zeolite adsorbents have a 3-dimensional pore structure. An amount of 5 mg of zeolite was contacted with 5 mL of an aqueous sample with a known PFOA concentration. As in Example 6, PFOA stock concentrations ranged from 0.1 mg/L to 500 mg/L (Table 1). The samples were shaken for 24 hours and PFOA uptake on the zeolite adsorbents was measured. The PFOA uptake on the zeolite adsorbents for different PFOA equilibrium concentrations is illustrated in FIG. 3. For graphical comparison, the PFOA isotherm for all-Si zeolite beta (Example 6) is also given. The uptake of PFOA on the all-Si silicalite-1 and very high-Si chabazite was very low, especially so when compared to the PFOA uptake on all-Si zeolite beta.

Example 7

Figure 4:
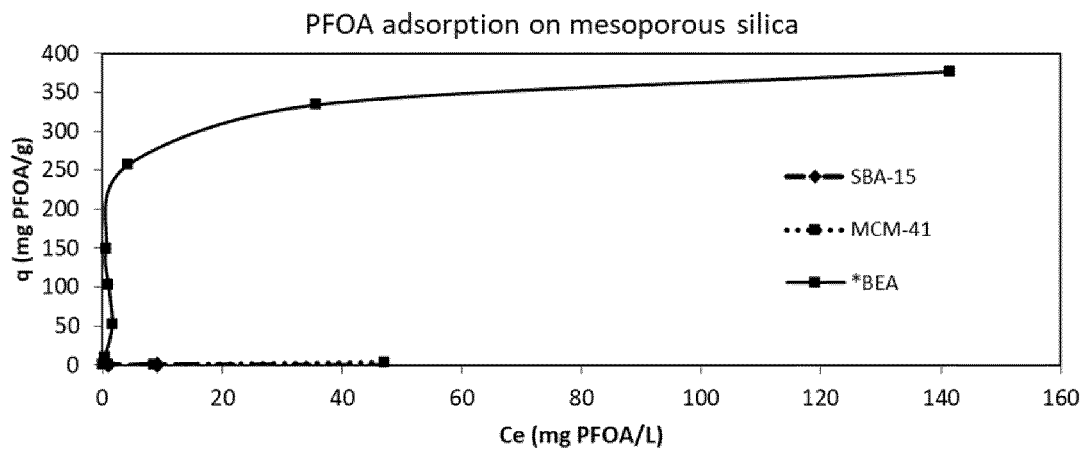
FIG. 4 shows an embodiment of PFOA uptake on mesoporous silica SBA-15 and MCM-41 for different PFOA equilibrium concentrations.

This experiment describes the use of two mesoporous silica adsorbents, SBA-15 and MCM-41 (as-synthesized, see Example 4) for the removal of PFOA from aqueous samples. An amount of 5 mg of silica adsorbent was contacted with 5 mL of an aqueous sample with a known PFOA concentration for 24 h. PFOA stock concentrations ranged from 0.1 mg/L to 500 mg/L (Table 1). The samples were shaken for 24 hours and PFOA uptake on the silica adsorbents was measured. FIG. 4 gives an illustration of the PFOA uptake on the mesoporous silica SBA-15 and MCM-41 for different PFOA equilibrium concentrations. For comparison, the PFOA isotherm for the all-silica zeolite beta is shown as well. The uptake of PFOA on the mesoporous silica materials was almost insignificant, especially so when compared to the PFOA uptake on all-Si zeolite beta.

Example 8

Figure 5:
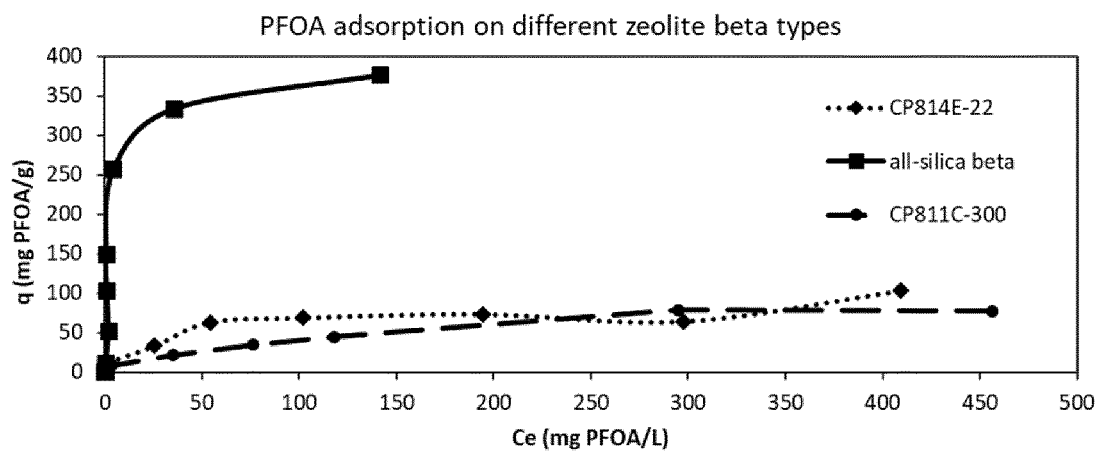
FIG. 5 shows an embodiments of PFOA uptake on two commercial zeolite beta adsorbents for different PFOA concentrations.

To show the influence of the all-Si character of zeolite beta on the adsorption of PFCs, the adsorption experiment of Example 5 is repeated for two commercial, Al-containing zeolite beta types: Zeolyst® CP814E-22 ($SiO_2/Al_2O_3$ ratio=22) and Zeolyst® CP811C-300 ($SiO_2/Al_2O_3$ ratio=300). FIG. 5 gives a graphical illustration of PFOA uptake on the two commercial zeolite beta adsorbents for different PFOA concentrations. For comparison, the PFOA isotherm for all-Si zeolite beta (Example 5) is also shown. This experiments showed that i) both the maximum adsorption capacity for PFOA and the affinity at lower PFOA concentrations were much higher on the all-Si zeolite beta than on the commercial, Al-containing zeolite beta types and ii) there was little difference in the PFOA uptake of a zeolite beta with a low and one with a high $SiO_2/Al_2O_3$ ratio (22 vs. 300).

Example 9

Figure 6:
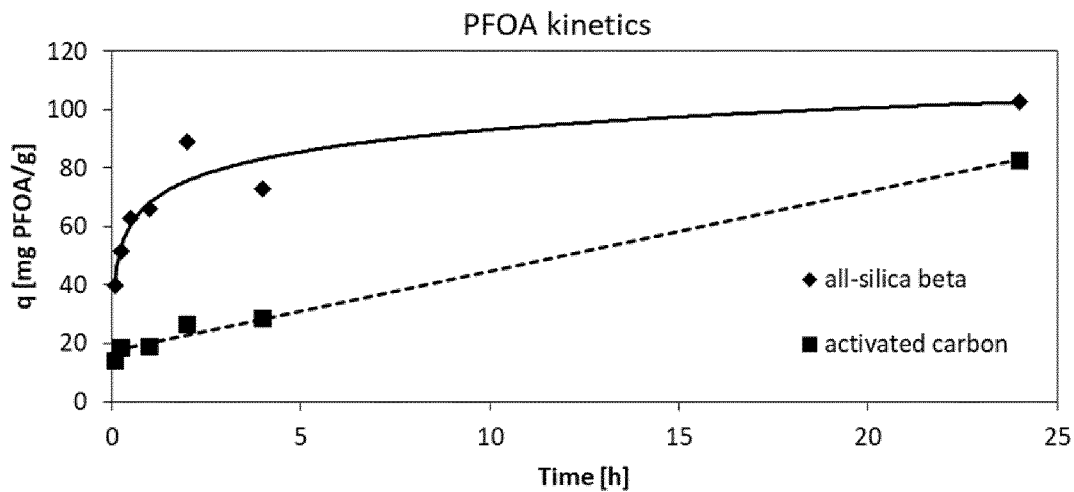
FIG. 6 shows uptake of PFOA on all-Si zeolite beta and activated carbon in function of time.
Figure 7:
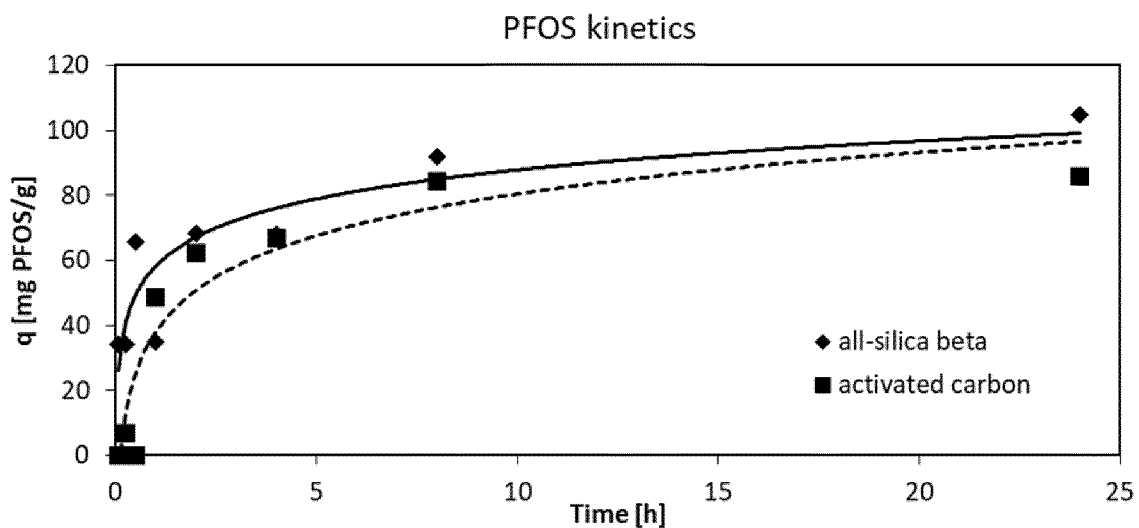
FIG. 7 shows uptake of PFOS on all-Si zeolite beta and activated carbon in function of time.

This experiment investigates the kinetics of PFOA and PFOS adsorption on all-Si zeolite beta (as-synthesized, Example 1-2) and a commercial, granular activated carbon (Norit SX 1 G). 5 mg of adsorbent was contacted with 5 mL of a 100 mg/L PFOA or PFOS concentration and shaken for different time durations (5 min, 15 min, 30 min, 1 h, 2 h, 4 h and 24 h). FIG. 6 gives a graphical representation for the uptake of PFOA on all-Si zeolite beta and activated carbon in function of time. FIG. 7 illustrates this for the uptake of PFOS. The uptake of PFOA was much faster on all-Si zeolite beta than on activated carbon, while the kinetics of PFOS adsorption were similar for both adsorbent types.

Example 10

Figure 8:
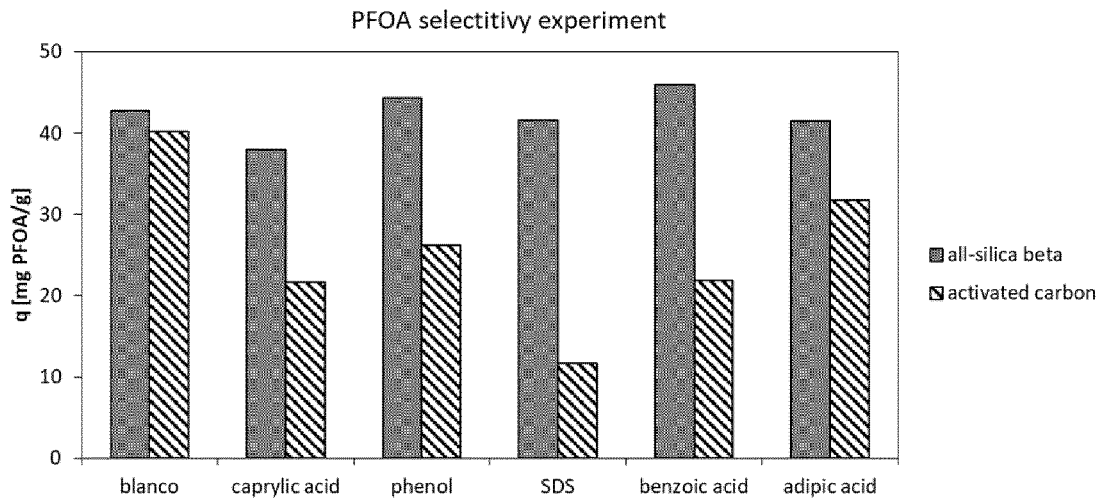
FIG. 8 shows PFOA uptake on all-Si zeolite beta and activated carbon in the presence of an equimolar amount of one of five selected organic competitors.
Figure 9:
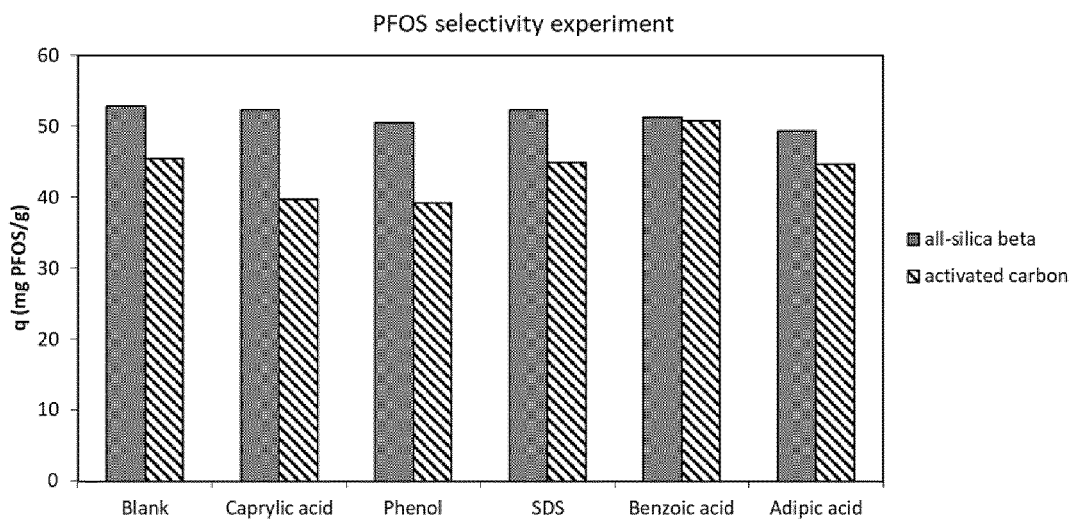
FIG. 9 shows PFOS adsorption on all-Si zeolite beta and activated carbon in the presence of equimolar amounts of one of five selected organic competitors.

This experiment describes the selectivity of all-Si zeolite beta and a commercial, granular activated carbon (Norit SX 1 G) for PFOA and PFOS over other, organic compounds in equimolar concentrations. Similar to the method described in Experiment 5-8, 5 mg of adsorbent is contacted for 24 h with 5 mL of an aqueous sample with 100 µM of either PFOA or PFOS and 100 µM of an organic compound. This organic compound is either caprylic acid, phenol, sodium dodecyl sulfate (SDS), benzoic acid or adipic acid. FIG. 8 is a graphical illustration of the PFOA uptake on all-Si zeolite beta and activated carbon in the presence of an equimolar amount of one of the five selected organic competitors. For comparison, the PFOA uptake without presence of an organic compound is also shown (blank). FIG. 9 illustrates PFOS adsorption on all-Si zeolite beta and activated carbon in the presence of equimolar amounts of one of the five selected organic competitors. PFOA adsorption on all-silica zeolite was undisturbed by competition of an organic competitor: for all five organic compounds, PFOA uptake on the all-Si zeolite beta was similar as in the blank situation. In contrast, PFOA uptake on activated carbon was drastically reduced when another organic compound was present. On all-Si zeolite beta, also PFOS adsorption was undisturbed by competition of any of the five organic competitors. Activated carbon showed higher selectivity for PFOS than for PFOA, since its uptake was less influenced by the competition of organic compounds this time.

Example 11

Figure 10:
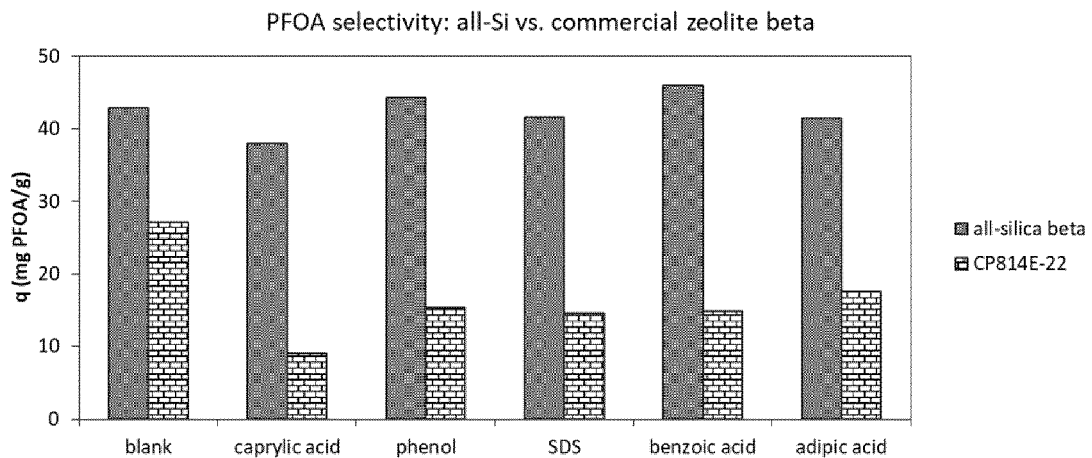
FIG. 10 shows PFOA uptake on CP814E-22 zeolite beta in the presence of an equimolar amount of one of five selected organic competitors.

To show the influence of the all-silica character of the zeolite beta framework, Example 10 was repeated for a commercial, Al-containing zeolite beta: Zeolyst® CP814E-22 ($SiO_2/Al_2O_3$ ratio=22). FIG. 10 illustrates the PFOA uptake on the CP814E-22 zeolite beta in the presence of an equimolar amount of one of the five selected organic competitors. For clear comparison, the PFOA adsorption under equimolar competition on all-Si zeolite beta (Example 12) is also shown. The adsorption of PFOA on the commercial, Al-containing zeolite beta was heavily reduced when there was competition of an organic compound, whereas this was not the case for all-Si zeolite beta.

Example 12

This experiment describes the selectivity of all-Si zeolite beta and a commercial, granular activated carbon (Norit SX 1 G) for PFOA and PFOS over other organic compounds that are present in a molar excess. Similar to the experiment in Example 10, 5 mg of adsorbent is contacted for 24 h with an aqueous solution of 100 µM of either PFOA or PFOS. This time, five organic compounds (caprylic acid, phenol, SDS, benzoic acid and adipic acid) were simultaneously present in the sample, either in a 1:1 or 1:3 (PFC:organic compound) molar ratio for every individual organic compound. So in the case of 1:1, there is a total fivefold molar excess of organic compounds over PFOA or PFOS ('all 1-1'). In the case of 3:1, there is a total fifteenfold molar excess of organic compounds over PFOA or PFOS ('all 1-3'). FIG. 11 gives a graphical illustration of the adsorption of PFOA on all-silica zeolite beta and activated carbon for the two different situations of organic competition ('all 1-1' and 'all 1-3'). For comparison, also the PFOA uptake without organic competition is given (blank). FIG. 12 similarly illustrates the uptake of PFOS on all-silica zeolite beta and activated carbon for the two different situations of organic competition in over-excess. For comparison, the blank result is also shown. The uptake of PFOA on all-Si zeolite beta was similar to the blank situation, even when there was an excess of organic compounds present. In contrast, PFOA adsorption on activated carbon was drastically reduced in these circumstances. Also PFOS adsorption on all-Si zeolite beta was similar to the blank situation, even when there was an excess of organic competitors. PFOS adsorption on activated carbon, however, was reduced significantly under these circumstances.

The invention claimed is:

1. A method for recovering a fluorinated surfactant from an aqueous or mixed aqueous organic solution containing the fluorinated surfactant, the method comprising:
   contacting the aqueous or mixed aqueous organic solution with a zeolite having a zeolite framework, the zeolite framework consisting of tetravalent cations and oxygen, wherein at least a portion of the tetravalent cations are tetrahedrally coordinated framework atoms, the zeolite comprising pores delineated by rings that comprise from 10 to 14 of the tetrahedrally coordinated framework atoms, the tetrahedrally coordinated framework atoms being selected from the group consisting of $Si^{4+}$, $Ge^{4+}$, $Ti^{4+}$, $Sn^{4+}$, $Zr^{4+}$, and $Hf^{4+}$.

2. The method according to claim 1, wherein the zeolite framework is non-charged and non-polar.

3. The method according to claim 1, wherein all tetrahedrally coordinated framework atoms of the zeolite are $Si^{4+}$.

4. The method according to claim 1, wherein the zeolite has at least one pore delineated by 12-membered rings.

5. The method according to claim 1, wherein the zeolite has a framework topology selected from the group consisting of AFI, *BEA, BEC, CON, EMT, FAU, IFR, ISV, IWW, MEI, MOR, MOZ, MSE, MTW, *STO, UOV, UTL, and YFI.

6. The method according to claim 1, wherein the fluorinated surfactant is selected from the group consisting of a linear perfluorinated alkylcarboxylic acid, a branched perfluorinated alkylcarboxylic acid, and a partially fluorinated alkylcarboxylic acid, wherein optionally one or more fluorinated alkyl groups of the fluorinated surfactant are substituted with a fluorinated ether group or a non-fluorinated ether group.

7. The method according to claim 1, wherein the fluorinated surfactant is a linear perfluorinated alkylsulfonic acid, a branched perfluorinated alkylsulfonic acid or alkylsulfonate, or a partially fluorinated alkylsulfonic acid or alkylsulfonate, wherein one or more partially fluorinated or perfluorinated alkyl groups of the fluorinated surfactant are substituted with a fluorinated ether group or a non-fluorinated ether group.

8. The method according to claim 1, wherein the fluorinated surfactant is a linear branched perfluorinated alcohol, a branched perfluorinated alcohol, or a partially fluorinated alcohol, wherein optionally one or more partially fluorinated or perfluorinated alkyl group is substituted with a fluorinated ether group or a non-fluorinated ether group.

9. The method according to claim 1, wherein the fluorinated surfactant is a fully or partially fluorinated alkylsulfate, a fully or partially fluorinated alkylcarboxylate ester, a fully or partially fluorinated alkylamine, or a fully or partially fluorinated alkylammonium compound.

* * * * *